(12) United States Patent
Aonuma

(10) Patent No.: US 11,860,517 B2
(45) Date of Patent: Jan. 2, 2024

(54) VERSATILE CAMERA DEVICE MOUNTABLE TO POLE

(71) Applicant: Joji Aonuma, Fuchu (JP)

(72) Inventor: Joji Aonuma, Fuchu (JP)

( * ) Notice: Subject to any disclaimer, the term of this patent is extended or adjusted under 35 U.S.C. 154(b) by 4 days.

(21) Appl. No.: 17/493,864

(22) Filed: Oct. 5, 2021

(65) Prior Publication Data

US 2022/0214603 A1    Jul. 7, 2022

(30) Foreign Application Priority Data

Jan. 7, 2021  (JP) ................................ 2021-001411
Jun. 15, 2021  (JP) ................................ 2021-099524

(51) Int. Cl.

| | | |
|---|---|---|
| *H04N 23/51* | (2023.01) | |
| *G03B 17/56* | (2021.01) | |
| *G02B 13/00* | (2006.01) | |
| *G03B 17/17* | (2021.01) | |
| *H04N 23/54* | (2023.01) | |
| *H04N 23/55* | (2023.01) | |

(Continued)

(52) U.S. Cl.
CPC ....... *G03B 17/561* (2013.01); *G02B 13/0065* (2013.01); *G03B 17/17* (2013.01); *H04N 23/51* (2023.01); *H04N 23/54* (2023.01); *H04N 23/55* (2023.01); *H04N 23/66* (2023.01); *A63B 57/40* (2015.10)

(58) Field of Classification Search
CPC ...... G03B 17/17; G03B 17/561; G03B 29/00; H04N 23/51; H04N 23/54; H04N 23/55; H04N 23/66; G02B 13/0065; G02B 13/06; A63B 2220/807; A63B 57/357; A63B 57/40

USPC .......................................................... 348/157
See application file for complete search history.

(56) References Cited

U.S. PATENT DOCUMENTS 5,884,913 A * 3/1999 Cohen ................ A63B 69/3694
                                                            473/192
10,645,286 B2   5/2020 Fridman et al.
(Continued)

FOREIGN PATENT DOCUMENTS

AU    2011295619 A1    4/2013
CN    201984272 U  *  9/2011  ............ G03B 17/56
(Continued)

OTHER PUBLICATIONS

Office Action dated Mar. 15, 2022, in corresponding Japanese patent Application No. 2021-099524, 8 pages.
(Continued)

*Primary Examiner* — Behrooz M Senfi
(74) *Attorney, Agent, or Firm* — XSENSUS LLP

(57) ABSTRACT

A versatile camera device to be mounted to a pole, includes a cylindrical portion, a leg portion, and a light-transmitting portion provided in a axial middle portion of the cylindrical portion toward the other end and forming a part of the cylindrical portion. Further included are a reflector which receives light entering from the light-transmitting portion and an image pickup camera which receives light reflected from the reflector at an image pickup unit. The device further includes a control substrate including a transmitter which generates radio waves including an image signal from the image pickup camera and a controller, a battery and a lid.

8 Claims, 13 Drawing Sheets

(51) Int. Cl.
*H04N 23/66* (2023.01)
*A63B 57/40* (2015.01)

(56) References Cited

U.S. PATENT DOCUMENTS

| | | | |
|---|---|---|---|
| 2009/0305803 A1* | 12/2009 | Reid | A63B 24/0021 |
| | | | 473/150 |
| 2010/0155549 A1* | 6/2010 | Robinson | F16M 11/28 |
| | | | 396/428 |
| 2015/0138311 A1* | 5/2015 | Towndrow | H04N 23/698 |
| | | | 348/36 |
| 2016/0191755 A1 | 6/2016 | Fromm | |
| 2020/0306586 A1* | 10/2020 | Cheung | A63B 57/357 |

FOREIGN PATENT DOCUMENTS

| | | | | |
|---|---|---|---|---|
| CN | 201984272 U | | 9/2011 | |
| CN | 104203072 A | * | 12/2014 | ......... A61B 1/00006 |
| JP | H07117968 A | * | 10/1993 | ............... B66C 1/10 |
| JP | 2000-224576 A | | 8/2000 | |
| JP | 2000-278230 A | | 10/2000 | |
| JP | 2005-192261 A | | 7/2005 | |
| JP | 2006-109001 A | | 4/2006 | |
| JP | 2006-340147 A | | 12/2006 | |
| JP | 3139297 U | | 2/2008 | |
| JP | 2008-167244 A | | 7/2008 | |
| JP | 2008167244 A | * | 7/2008 | ............. H04N 5/225 |
| JP | 2009-104082 A | | 5/2009 | |
| JP | 3179077 U | | 10/2012 | |
| JP | 2013-068449 A | | 4/2013 | |
| JP | 2014-235317 A | | 12/2014 | |
| JP | 2016-214114 A | | 12/2016 | |
| JP | 2017-39370 A | | 2/2017 | |
| JP | 2017-75481 A | | 4/2017 | |
| JP | 2020-515312 A | | 5/2020 | |
| JP | 6870160 B1 | | 5/2021 | |
| JP | 6870160 B1 | * | 5/2021 | ............. G03B 17/56 |
| WO | 2008/068499 A1 | | 6/2008 | |
| WO | 2010/134502 A1 | | 11/2010 | |
| WO | 2020/078346 A1 | | 4/2020 | |

OTHER PUBLICATIONS

Office Action dated Oct. 24, 2022, in corresponding Australian patent Application No. 2021240322, 9 pages.
Office Action dated Mar. 23, 2021, received for JP Application 2021-001411, 4 pages including English Translation.
Office Action dated Apr. 18, 2023 in Japanese Patent Application No. 2022-113911 and English translation thereof, 13 pages.
Office Action dated Aug. 1, 2023, in corresponding Japanese patent Application No. 2022-113911, 6 pages.

* cited by examiner

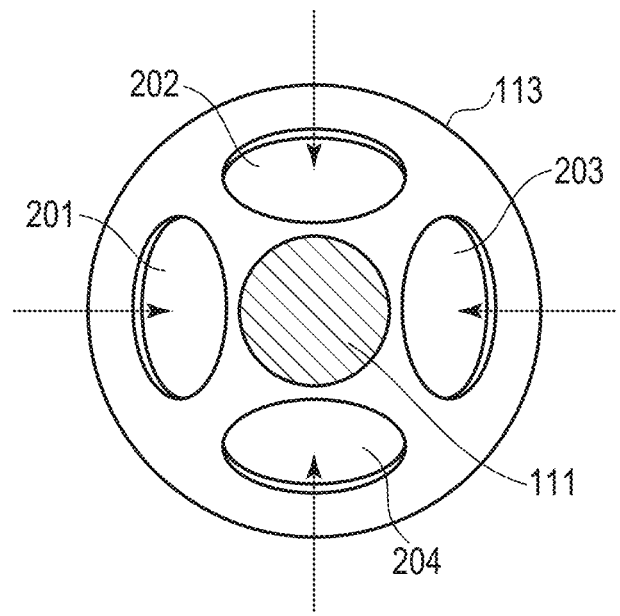
F I G. 2A
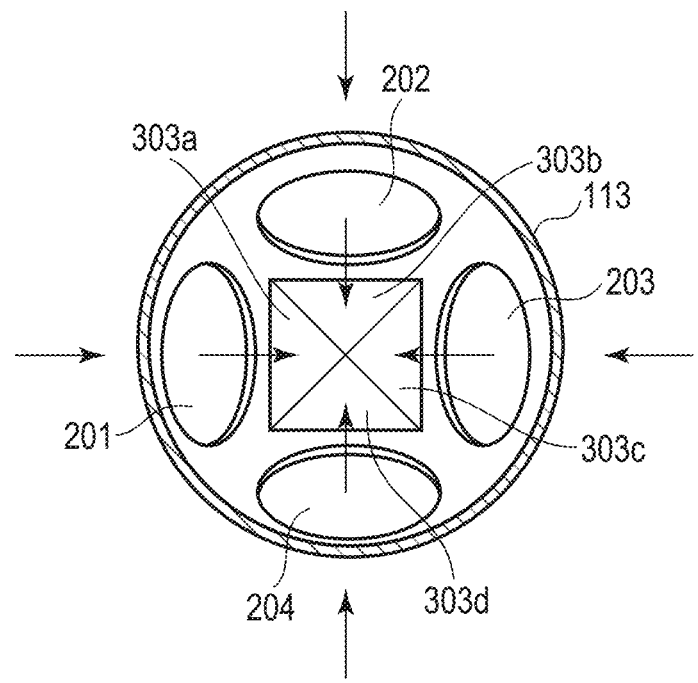
F I G. 2B

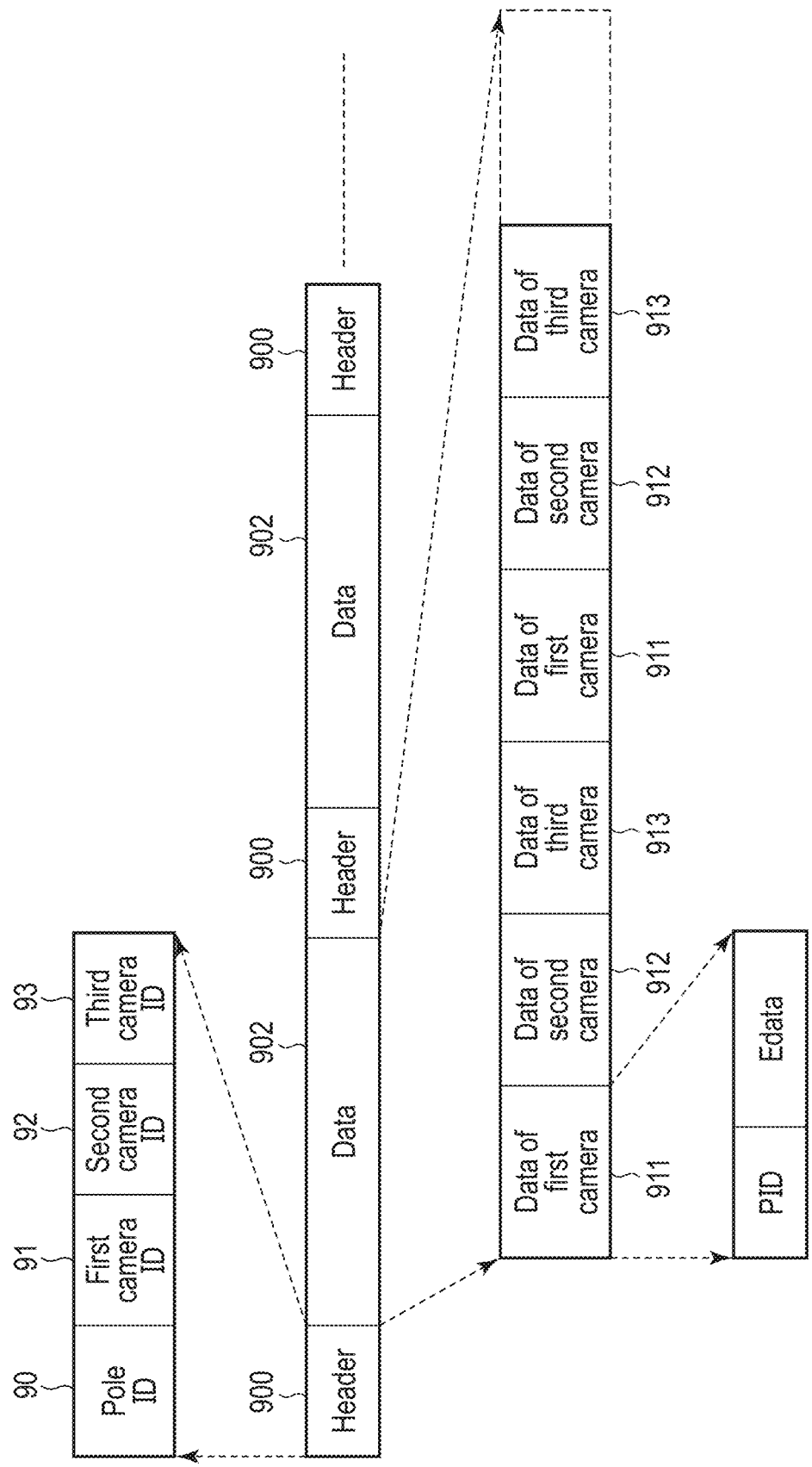
F I G. 13

VERSATILE CAMERA DEVICE MOUNTABLE TO POLE

CROSS-REFERENCE TO RELATED APPLICATIONS

This application is based upon and claims the benefit of priority from prior Japanese Patent Applications No. 2021-001411, filed Jan. 7, 2021; and No. 2021-099524, filed Jun. 15, 2021, the entire contents of all of which are incorporated herein by reference.

BACKGROUND OF THE INVENTION

1. Field of the Invention

Embodiments of the present invention described herein relate generally to a versatile camera device mountable to a pole, which is easy to handle and suitable for observation in a variety of occasions.

2. Description of the Related Art

Conventional observation cameras are used in a variety of locations. Conventional observation cameras have been devised in their form (shape, equipment, accessories, etc.), installation method, etc., depending on the place where they are used and the conditions of the location. For this reason, various types of observation cameras have developed independently and are expensive.

As a result, conventional observation cameras may be regarded to be inferior in terms of versatility.

BRIEF SUMMARY OF THE INVENTION

According to one embodiment, a versatile camera device to be mounted to a pole, includes a cylindrical portion, a leg portion, and a light-transmitting portion provided in a axial middle portion of the cylindrical portion and forming a part of the cylindrical portion. Further included are a reflector which receives light entering from the light-transmitting portion and an image pickup camera which receives light reflected from the reflector at an image pickup unit. The device further includes a control substrate including a transmitter which generates radio waves including an image signal from the image pickup camera.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2A is a cross-sectional view of a light-transmitting portion 113 seen from below (a leg portion side), as cutting the pole along line A1-A2 in FIG. 1.

FIG. 2B is a cross-sectional view of the light-transmitting portion 113 seen from above (a cylindrical portion side), as cutting the pole along line B1-B2 in FIG. 1.

FIG. 13 is an explanatory diagram showing an example of a data format adopted by a transmitter/receiver provided in the camera device according to this embodiment.

DETAILED DESCRIPTION OF THE INVENTION

Figure 1:
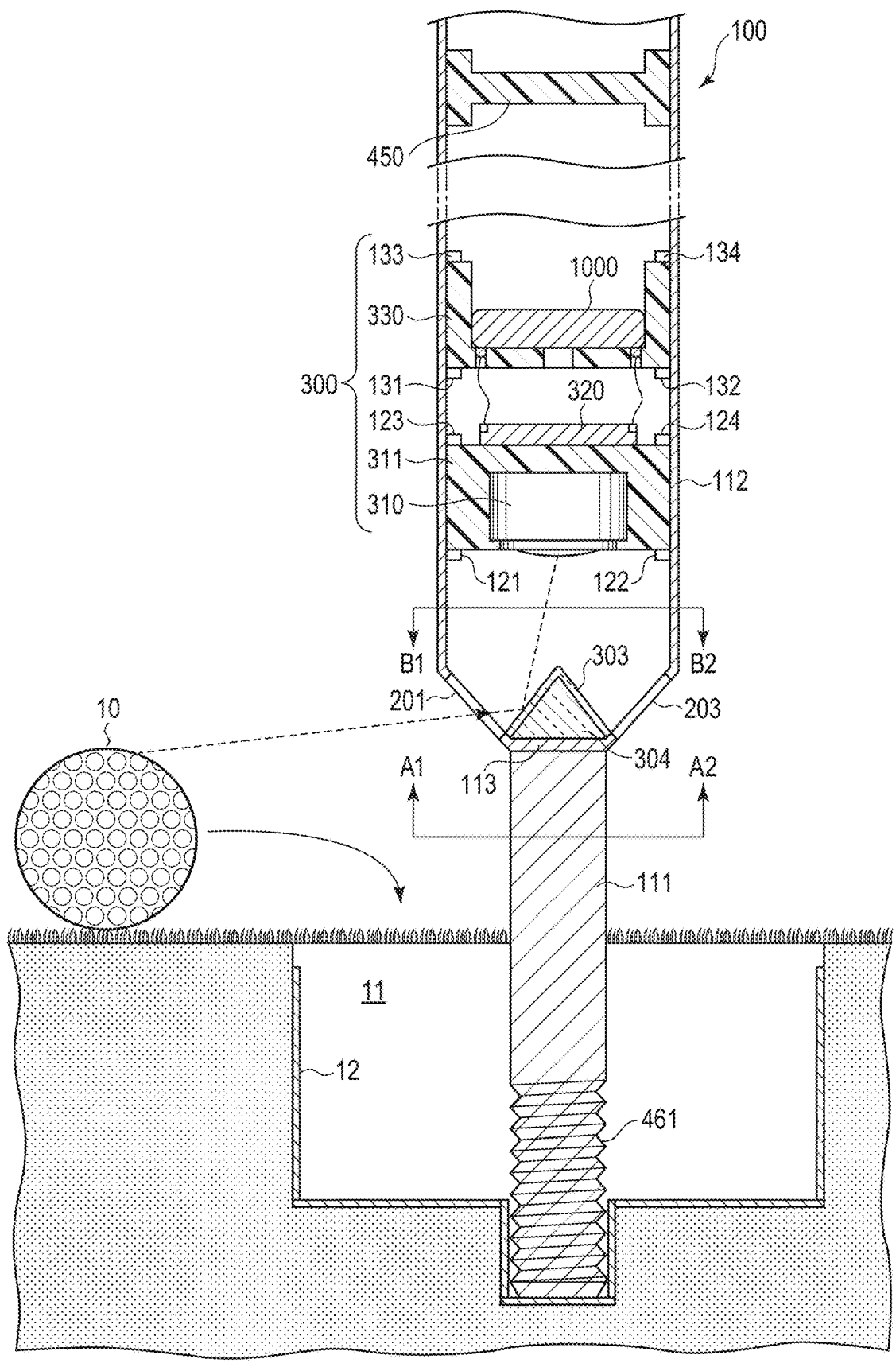
FIG. 1 is an explanatory diagram showing a configuration example of a versatile camera device that can be mounted to a pole according to an embodiment.

Embodiments of the present invention will now be described with reference to the accompanying drawings. Note that these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions. Further, with regard to the structural components recited in the claims, they may be represented in divisions and/or combinations by any form, but they are still encompassed within the scope of the inventions. Furthermore, two or more embodiments may also be combined, and such examples of the combination are also within the scope of the invention.

The drawings may be schematically represented with respect to the width, thickness, shape, etc., of each part compared to the actual state in order to make the explanation clearer. Further, the names and terms used here are not limited, and even if other expressions are used, they are included in the present invention as long as they are of substantially the same contents and purports.

The embodiments of the present invention provides a versatile camera device to be mounted on a pole that is of a simple configuration, multiple uses, and implementable at low cost.

According to one embodiment, the basic configuration comprises, for example, a cylindrical portion, a leg portion mounted to the cylindrical portion to extending one end portion of the cylindrical portion, a light-transmitting portion provided in a axial middle portion of the cylindrical portion toward the other end and forming a part of the cylindrical portion, a reflector which receives light entering from the light-transmitting portion and guides the light to one axial side thereof, and an image pickup camera disposed inside the cylindrical portion and receiving the light reflected from the reflector at an image pickup unit.

The basis configuration further comprises a control substrate disposed inside the cylindrical portion and comprising a transmitter which generates radio waves including the image capture signal from the image capture camera and a controller, a battery disposed inside the cylindrical portion and driving the transmitter, the controller and the image pickup camera and a lid which seals the other end of the cylindrical portion and encloses the reflector, the image pickup camera, the control substrate and the battery. The first embodiment will now be described. This embodiment is extremely advantageous when used in the following situations.

(1) There is a demand of viewing, for example, the ball on the green heading for the cup from the cup side to as to enjoy golf more. There is also a demand of being able to observe how the golf ball changes its course near the cup and rolls in a direction away from the cup.

There is also a demand of viewing how the ball flying away around the pole. An example of such a scene is a situation that, when a player hits a ball from a bunker aiming at the flagpole, the ball may hit the flagpole directly, or fly to the right or left of the flagpole.

To meet such demands, according to an embodiment, there is provided a versatile camera device mountable to the pole, which can shoot such a scene of how a golf ball rolling on the green toward at least the cup from the cup side. More specifically, according to this embodiment, there is provided a versatile camera device mountable to a pole, which is placed in the axial middle of the pole comprising leg portions to stand on the bottom of the cup.

(2) There is also a demand for a camera device that is effective and easy to use when observing living things in rivers, forests, woods, fields, grounds, gardens, etc., or when observing winds and rains, their influences on the ground and changes in the ground surface.

(2-1) Under these circumstances, such a versatile camera device is provided that is to be mounted on a pole, whose multiple camera installation modes (usage types or installation states) can be easily changed over therebetween.

Thus, the leg portion includes a locking section, to which an adapter can be mounted to extend the distal end portion of the leg portion or change the direction of the end portion thereof.

(2-2) Further, a versatile camera device to be mounted to a pole is provided, which can be used as hanging a cylindrical portion containing a built-in image pickup camera, from a branch or the like when the adapter is formed into a hook shape. With this device, it is easy to observe insects living on tree branches, small birds gathering on tree branches, bird nests on tree branches, etc.

(2-3) Furthermore, such a versatile camera device to be mounted to a pole is provided, that can be used with the leg portions standing up, for example, on the bottom of a river, when the adapter is flange-shaped. With this device, it is possible to observe the ecology of various living organisms in rivers, lakes, and the sea.

(2-4) Furthermore, such a versatile camera device to be mounted to a pole is provided, that can be used by easily sticking the leg portions into any position on the ground when the adapter is arrowhead-shaped. With this device, it is easy to observe wildlife (insects, reptiles, wild animals, or livestock) in the wilderness.

According to the above-described versatile camera devices to be mounted to a pole, it is possible to easily observe and monitor insects, animals, plants, agricultural products, rivers, road conditions, and areas around houses.

(2-5) Furthermore, the above-described versatile camera devices can also be used as a sensor and/or guide for a guidance system when multiple devices are set. For example, multiple devices are placed along a mountain trail or along a predetermined pathway. In this manner, the guidance system can monitor passersby on the trail or along the predetermined pathway, and can also alert passersby who goes off the track by voice or wireless system. In this case, the multiple devices are connected to the server via relay means/network, and the server is connected to the control center.

The embodiment in FIG. 1 provides a versatile camera device that is mounted to a pole placed in a axial middle portion of the pole (in this case, it may be referred to as a flagpole), which used with its leg portion standing on the bottom of a cup.

The embodiment comprises a cylindrical portion 112, a leg portion 111 attached by extending one end of the cylindrical portion 112 and tapering off towards its distal end, and a light-transmitting portion 113 provided in the middle portion along the axial direction toward the other end of the cylindrical portion 112, which also forms a part of the cylindrical portion 112. The device also comprises a reflector 303 that receives light incident from the light-transmitting portion 113 and guides it to one side of the axial direction, and an image pickup camera 310 disposed inside the cylindrical portion 112 and receives light reflected from the reflector 303 at an image pickup portion.

Moreover, the device comprises a control substrate 320 disposed inside the cylindrical portion 112 and equipped with a transmitter and a controller that generate radio waves including an image pickup signal from the image pickup camera 310, and a battery 1000 disposed inside the cylindrical portion 112, which drives the transmitter and the controller mounted on the control substrate 320 and the image pickup camera 310. Further, a lid 450 is provided to seal the other end side of the tube 112 and confine the reflector 303, the image pickup camera 310, the control substrate 320 and the battery 1000 inside the cylindrical member 112.

The above-described embodiment is effective when applied to a flagpole. FIG. 1 shows a hole 11 in a green, a cup 12 disposed in the hole 11, and a pole 100 is set to stand in the center of the cup 12. A distal end (one end) of a leg portion 111, which is one end of the pole 100, is inserted into a pole insertion hole formed in the bottom of the cup 12. With this structure, the pole 100 stands upright vertically.

A proximal end (the other end) of the leg portion 111 is joined coaxially to the cylindrical portion 112 of the pole 100. The cylindrical member 112 and the leg portion 111 are different from each other in diameter, the light-transmitting portion 113 is used as a coupling means. The light-transmitting portion 113 forms a part of the cylindrical portion 112 and may be referred to as a coupling or joining tool.

One end of the light-transmitting portion 113 forms a bottom portion, and the bottom portion is joined to the other end of the leg portion 111, for example by welding. The other end portion of the light-transmitting portion 113 is open and is integrated with and joined to the opening of the cylindrical member 112.

Thus, in this case, the light-transmitting portion 113 comprises an inclined side wall. Window portions 201 to 204 are formed in multiple locations on the side wall. The window portions 201 to 204 are arranged, for example, circumferentially around the side wall. The window portions 201 to 204 may be of a flat type, such as transparent synthetic resin or glass in practice, or a wide angle lens or a fisheye lens may as well be disposed. The light-transmitting portion 113 which includes the window portions 201 to 204 described above can be regarded as a part of the cylindrical portion 112.

Note that the wall thickness of the light-transmitting portion 113 including the window portions 201 to 204 should preferably be greater than that of the cylindrical portion 112 for reinforcement.

The pole 100 includes the cylindrical portion 112, the leg portion 111 and the light-transmitting portion 113 which is a part of the cylindrical portion 112. The leg portion 111 is located in the axial one end of the cylindrical portion 112 and is less than the cylindrical portion 112 in thickness. The light-transmitting portion 113 includes a large diameter portion continuously joined to one end of the cylindrical portion 112 and a small diameter portion continuously joined to the leg portion 111. Furthermore, the light-transmitting portion 113 comprises an inclined wall that is inclined with respect to the axis between its large and small diameter portions, and the multiple window portions 201 to 204 made in the inclined wall.

Further, to the leg portion 111, an adapter can be attached to extend its distal end portion or changes the direction thereof. Therefore, the leg portion 111 is formed with a lock portion 461 which locks the adapter. In this example, the lock portion 461 has a screw structure. When, for example, a hook-type adapter is mounted to the lock portion 461, the extended posture of the leg portion 111 is bent, for example, into a V- or U-shape. Then, with the adapter, the pole 100 can be hanged on a tree branch, for example. Further, it can be used in a variety of ways, making it easy to use. For example, it is easy to hang the camera device for storage or install in a high position.

FIG. 2A is a cross-sectional view of the pole 100 cut along line A1-A2 in FIG. 1, viewing the light-transmitting portion 113 from below (a leg portion side) and above the pole. FIG. 2B is a cross-sectional view of the pole 100 cut along line B1-B2 in FIG. 1, viewing the light-transmitting portion 113 from above (a cylindrical portion side).

The window portions 201 to 204 may be released open, but usually a window material such as glass or plastic is fit therein with waterproof and dustproof process. A reflector 303 is disposed in a deep section of each of the window portions 201 to 204. The reflector 303 is, for example, a mirror and comprises a mirror (a reflective component) corresponding to the respective one of the window portions 201 to 204.

As shown in FIG. 2B, the reflective components 303a, 303b, 303c and 303d correspond respectively to the window portions 201 to 204. The reflective components 303a, 303b, 303c and 303d are combined in a pyramidal shape of a structure to ensure a view around the axis (360 degrees). The reflective components 303a, 303b, 303c and 303d are mounted to a fixation base 304, for example, at a set reflection angle. Therefore, surfaces on which the reflective components 303a, 303b, 303c and 303d are placed respectively on the fixation base 304 are precisely manufactured so as to introduce the reflection light accurately to the lens of the microelectronic camera 310. Note that the reflector 303 has a square pole-like shape in appearance, but it may as well be a triangle pole. The window portion may as well be constituted by three windows to correspond to a triangular prism-shaped reflector. Furthermore, the reflector 303 may as well be a conical cylindrical mirror. The image processing unit of the camera, which will be described later, may be equipped with a distortion adjustment function to adjust the ratio between vertical and lateral directions (aspect ratio) of the captured images. Thus, it is possible to adjust the distortion of the image captured with a lens such as a wide-angle lens or a fisheye lens, for example, and the distortion of images can be corrected.

With the above-described configuration, the reflector 303 reflects the light entering from outside through the window portion (which may be referred to as a window as well) and directs it toward the other end (the upper portion) of the cylindrical portion 112. The light reflected by the reflector 303 then enters the image pickup section of the microelectronic camera 310. The microelectronic camera 310 is disposed and fixed inside the cylindrical portion 112 via a camera holder 311. Therefore, the microelectronic camera 310 can shoot a subject (for example, a golf ball) on the green through the reflector 303 and the window portion 201. For example, in order to shoot a golf ball 10 rolling on the green and approaching a cup 12, when viewing on the green from the lens of the camera through the reflector 303, it is preferable that the installation angle of each reflective component be adjusted to capture the front and obliquely downward side of the ball. It is then important that the camera device 300 catches the golf ball 10 located at the edge of the hole 11 or cup in its field of view through the reflector 303. In other words, it is important that the area including a part of the edge of the hole 11 or a part of the edge of the cup 12 is covered by the shooting area.

Further, a substrate 320 is mounted to the camera holder 311, and on the substrate 320, the control unit that controls the microelectronic camera 310, the image processing unit and a communication unit (transmitter/receiver) are mounted. The camera holder 311 holding the microelectronic camera 310 is held by stoppers 121 to 124 formed to protrude from the inner wall of the cavity of the cylindrical portion 112. Note that, although not shown in the figure, a flag can be tied to the extension of the other end of the cylindrical portion 112.

In the cylindrical portion 112, a battery holder 330 is further disposed above the substrate 320. The battery holder 330 is cup-shaped with a bottom, and a thin battery 1000 can be placed therein. The power from the battery 1000 is supplied to the various circuits of the above-described substrate 320 and the microelectronic camera 310. As in the case of the above-described camera holder 311, the battery holder 330 is also held by stoppers 131 to 134 formed to protrude from the inner wall of the cavity of the cylindrical portion 112.

Note that the battery holder 330 may be configured to be integrated with the camera holder 311 as one body. With this configuration, the camera 310, the substrate 320 and the battery 1000 can be mounted to the camera holder 311 beforehand, and the camera holder 311 can be incorporated to the cylindrical portion 112.

Figure 3:
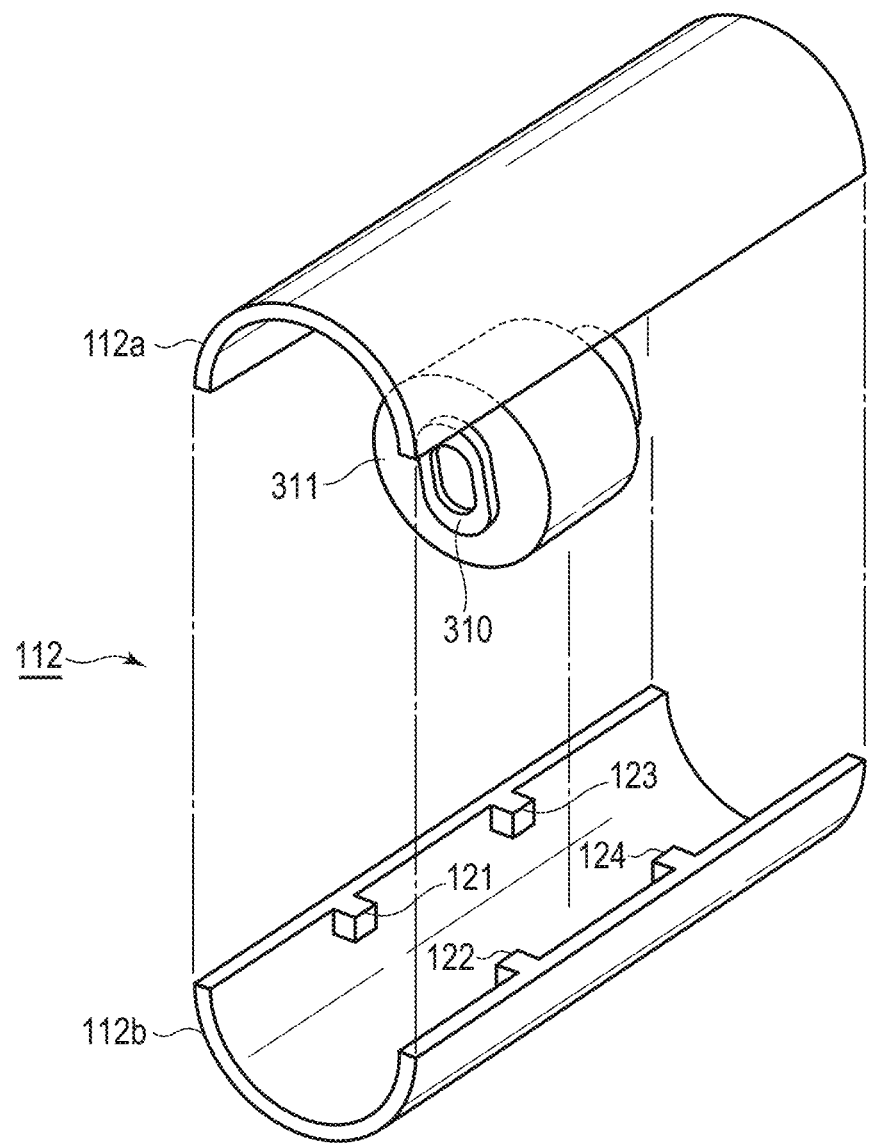
FIG. 3 is an explanatory diagram showing a part of a cylindrical portion 112 in which a camera device 300 is installed, which illustrates an example of a method of holding a micro-electronic camera 310.

FIG. 3 shows a part of the cylindrical portion 112 of the camera device 200 described above, to illustrate an example of how to hold the microelectronic camera 310. The cylindrical portion 112 can be divided, for example, into two parts along the diameter direction, to prepare symmetrized half-cylindrical portions 112a and 112b. To the half-cylinder portion 112b, stoppers 121 to 124 are formed to be integrated therewith in advance, to clip the camera holder 311 from above and below in the axial direction. The camera holder 311 is pushed into the groove of the semi-cylindrical portion 112b before the semi-cylindrical portions 112a and 112b are combined together, held by the stoppers 121 to 124 as shown in FIG. 1, and further fixed by adhesive.

Although not shown, the battery holder 330 is also fixed to the semi-cylindrical portion 112b in a similar manner. After that, the semi-cylindrical portions 112a and 112b are assembled together to be integrated as one body. The method of integrating the semi-cylindrical portions 112a and 112b is not limited to that discussed in this embodiment, but various methods may as well be possible. Various methods can be adopted, for example, a cap method used for the body and cap of a fountain pen, and the tightening method using a screw structure, for example.

Figure 4:
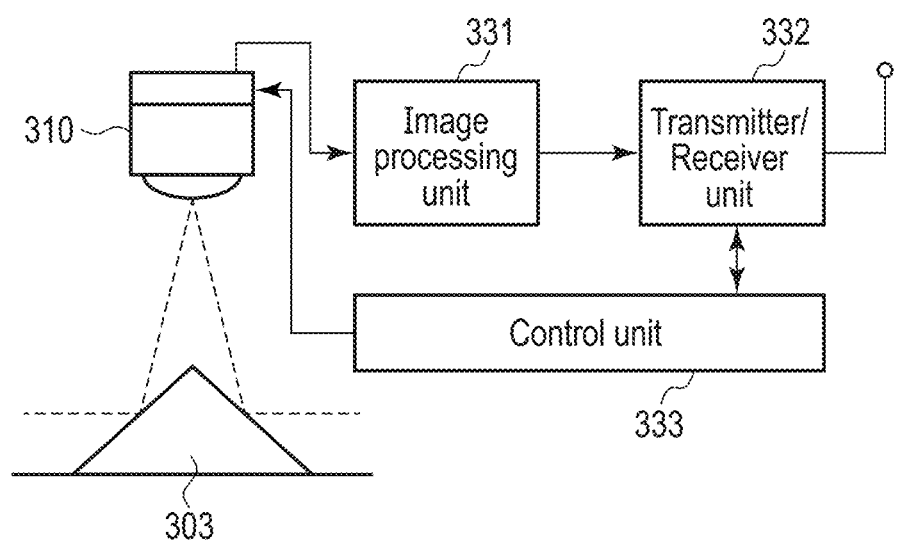
FIG. 4 is an explanatory diagram showing a configuration of a signal processing system of the camera of the embodiment shown in FIG. 1.

FIG. 4 is an explanatory diagram showing the above-described microelectronic camera and the various circuit portions provided on the substrate 320. An image signal from the microelectronic camera is input to the image processing unit 331 and subjected to processing including a compression process (encoding) and the like. The encoded image signal is converted into a transmission signal in the transmitter/receiver unit 332, which includes a transmitter and a receiver, and is sent to the user's wireless receiver (not shown), for example, by a wireless signal such as Blue Tooth (registered trademark) or Wi-Fi (registered trademark). The wireless receiver can, for example, relay the received signal and transmit it to the recording device. Or, the wireless receiver can transmit the received signal to the monitor room of the broadcasting facility. The image processing unit 331 comprise a distortion adjustment function to adjust the ratio between vertical and lateral directions (aspect ratio) of the captured images, or the aspect ratio may be adjusted by the signal processing unit in the monitor room. Further, the wireless receiver may be a smart phone.

The transmitter/receiver unit 332 can also receive a control signal from a remote control device (remote controller) or a smart phone, and the received control signal is interpreted by the control unit 333 to control the microelectronic camera 310. The contents of the controlling include, for example, focus, aperture, and the like.

As described above, the light-transmitting portion 113 includes an inclined wall that is inclined between the large and small diameter portions with respect to the axis and the window portions 201 to 204 provided in the inclined wall. The camera device 300 comprises a reflector 303 disposed inside the light-transmitting portion 113 so as to reflects light entering from outside through the window portions 201 to 204 and guides it towards the other end portion of the cylindrical portion 112, and the camera 310 disposed inside the cylindrical portion 112 so as to capture optical images from the reflector 303 with its image pickup unit.

The embodiment described above is of a fixed type in which the reflector 303 and the microelectronic camera 310 are fixed. However, the present invention is not limited to the embodiment described above. The basic idea remains the same as that of the embodiment shown in FIG. 1, but in other embodiments, the microelectronic camera 310 can be rotated along with the reflector 303 by a motor and its rotational position can be remotely controlled.

Figure 5:
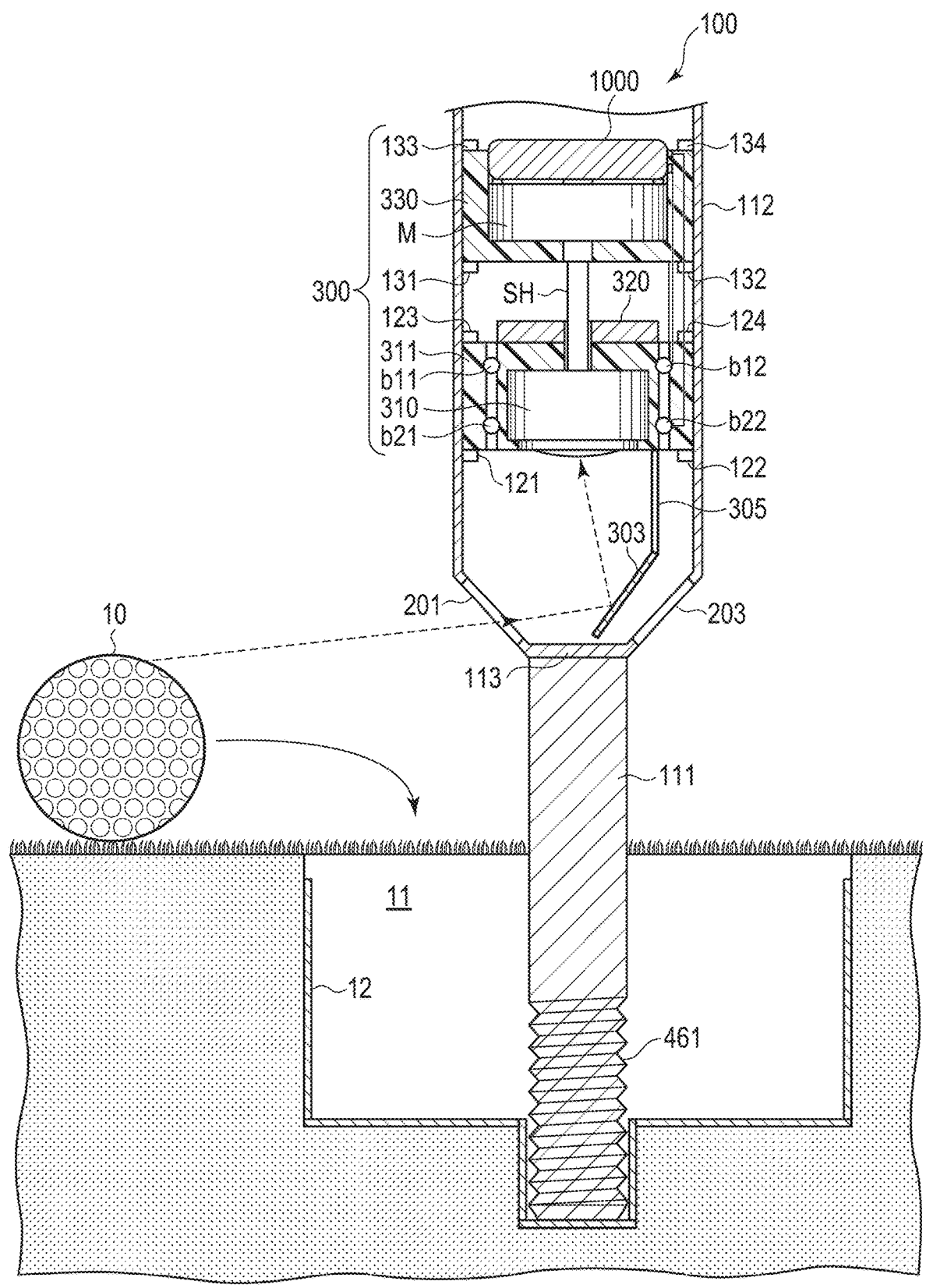
FIG. 5 is an explanatory diagram showing a configuration example of a camera device that can be mounted to a pole according to another embodiment.

FIG. 5 shows another embodiment, and the same parts as those of the embodiment shown in FIG. 1 are marked with the same referential signs as those used in FIG. 1. The parts that differ from the structure shown in FIG. 1 will be explained below. According to this embodiment, a motor M is provided with respect for the battery holder 330. The rotation shaft SH of the motor M penetrates the substrate 320 and the bottom of the camera holder 311, and is coupled to the microelectronic camera 310.

With this structure, in this embodiment, the microelectronic camera 310 can be rotated by controlling the rotation of the motor M.

In order for the microelectronic camera 310 to be able to rotate, the camera holder 311 is configured separately from a fixed side and a rotating side. The fixed side rotatably supports the rotating side via ball bearings b11, b12, b21 and b22. The ball bearings b11, b12, b21 and b22 are also used as power supply components for the circuits of the microelectronic camera 310 and substrate 320 just as slip ring terminals. Although not shown in the figure, with a wiring system using slip ring terminals, control signals can as well be given to the motor M from the control unit provided on the substrate 320. By controlling the rotational position of the motor M, the rotational position of the microelectronic camera 310 is also controlled. Note that each slip ring terminal comprises one terminal provided on the fixed side and the other terminal provided on the rotating side, which forms a mechanism to maintain the contact state at all times.

To the rotating side of the camera holder 311, a reflector 303 is mounted via an arm 305. The reflector 303, according to its rotational position, can reflect the light entering from the window portions 201 to 204, and guide it to the lens of the microelectronic camera 310.

Figure 6:
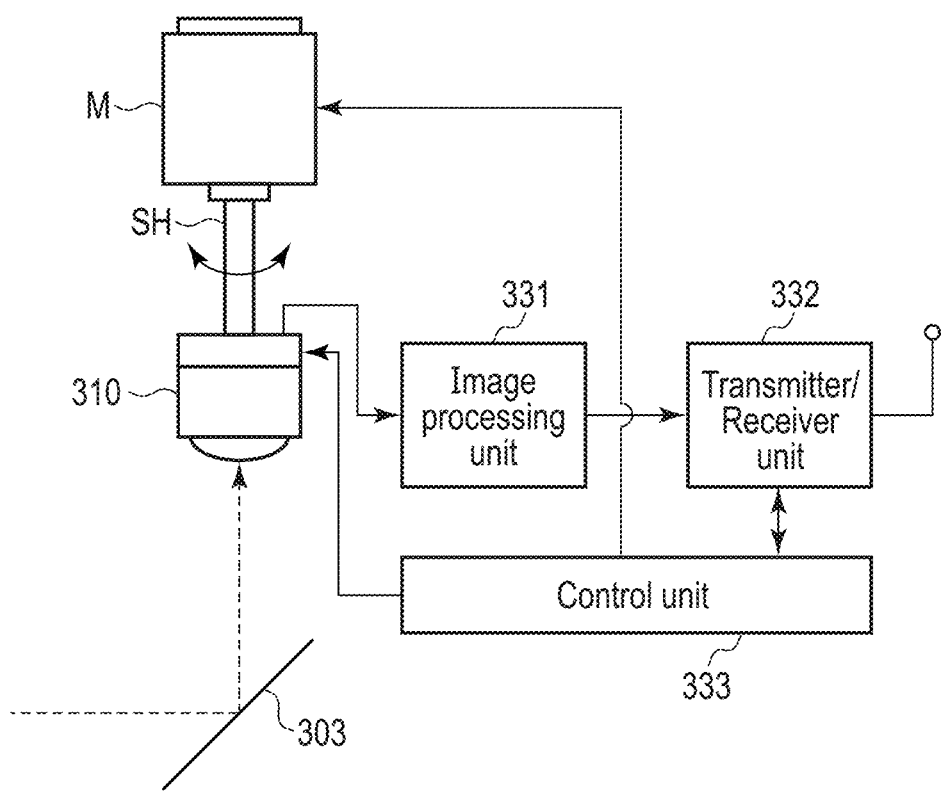
FIG. 6 is an explanatory diagram of a configuration of a signal processing system of the camera according to the embodiment shown in FIG. 5.

FIG. 6 is an explanatory diagram illustrating the above-described microelectronic camera 310 and the various circuit parts provided on the substrate 320. An image signal from the microelectronic camera 310 is input to the image processing unit 331 and subjected to processing including a compression process (encoding) and the like. The encoded image signal is converted into a transmission signal in the transmitter/receiver unit 332 and sent to the user's wireless receiver (not shown), for example, by a wireless signal such as Blue Tooth (registered trademark) or Wi-Fi (registered trademark). The wireless receiver can, for example, relay the received signal and transmit it to the recording device. Alternatively, the wireless receiver can transmit the received signal to the monitoring room of the broadcasting facility or to a smart phone.

The transmitter/receiver unit 332 can also receive a control signal from a remote control device (remote controller) or a smart phone, and the received control signal can be interpreted by the control unit 333 to control, for example, the microelectronic camera. The contents of the control include, for example, focus, aperture and the like. Further, the control unit 333 can control the rotational position (rotational angle) of the motor M according to an operation signal from outside. Thus, it is possible to change or adjust the shooting direction.

It is preferable that the diameter of the above-described leg portion 111 be about 12.7 mm, the diameter of the cup be about 108 mm (±5 mm), and the distance from the inner wall of the cup to the outer circumferential surface of the leg portion be about 47.7 mm (±5 mm). Further, the height from the green surface to the bottom of the joined portion should desirably be 7.62 cm (±5 mm). The diameter of the cylindrical portion should desirably be about 25.5 mm (±5 mm), but it may be greater. When used as a golf-related device, the device should conform to the standards set by golf-related authorities.

Moreover, the camera device used in the embodiment may be equipped with a function to display a level mark to check the levelness of the screen, and naturally may be provided with an anti-shake function as well.

Figure 7:
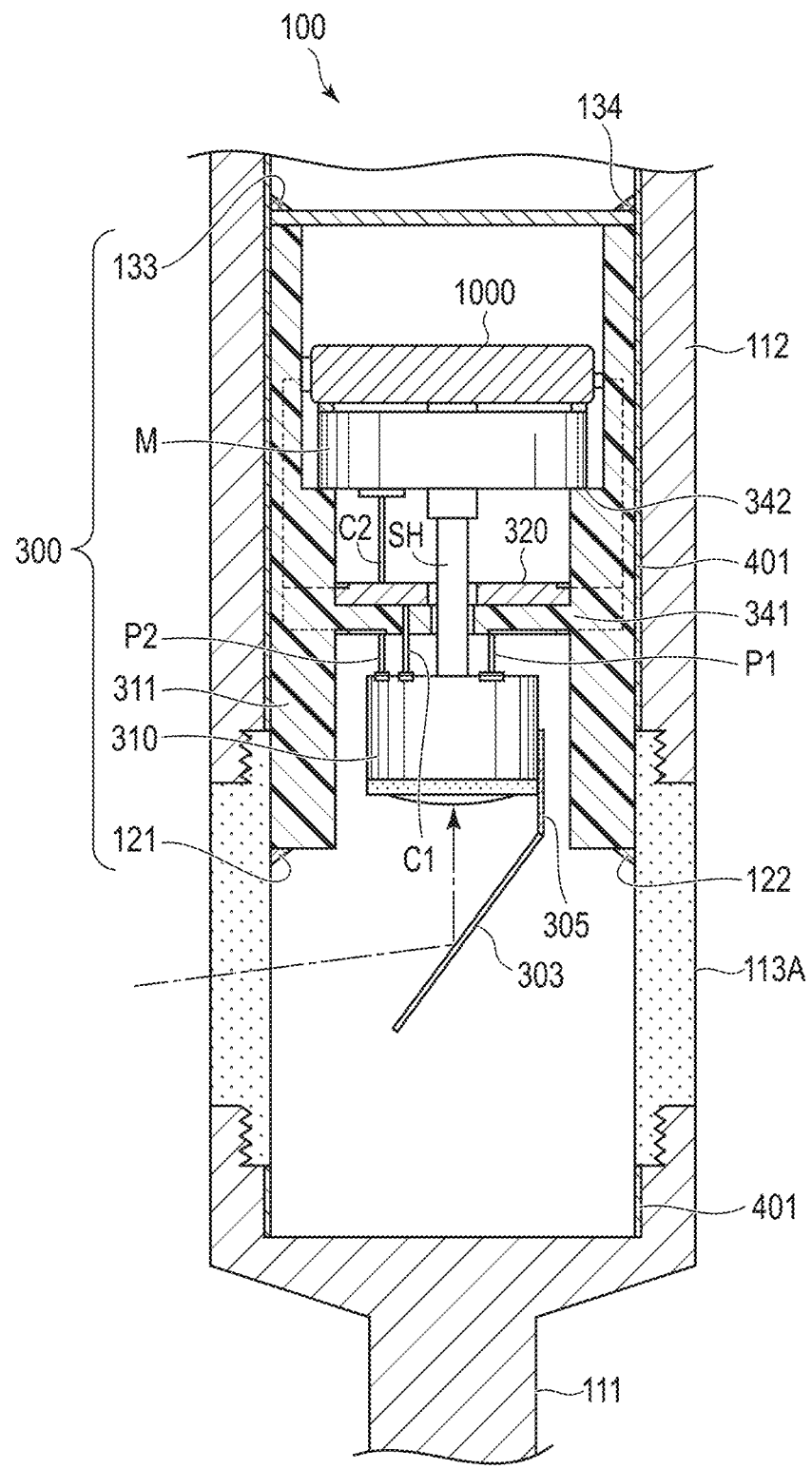
FIG. 7 is an explanatory diagram of a configuration of still another embodiment.

FIG. 7 is an explanatory diagram illustrating a configuration of still another embodiment. The same functional parts as those of the previous embodiment are marked with the same referential signs as those used in the embodiment. Note that in the embodiments shown in FIGS. 1 and 5, the window portions 201 to 204 are formed in the inclined wall of the light-transmitting section 113.

However, the configuration of the light-transmitting section 113 is not limited to those of the above-provided embodiments. As shown in FIG. 7, the pole 100 may include a cylindrical portion 112, a leg portion 111, and a cylindrical light-transmitting portion 113A. Here, the cylindrical portion 112 of the pole is formed of carbon fiber or plastic, for example, and a reinforcement cylindrical member 401 made of iron or aluminum may be inserted in its inner circumferential portion so as to increase the strength of the cylindrical portion 112.

The above-described cylindrical light-transmitting section 113A is made of transparent reinforced plastic, and can join the cylindrical portion 112 and the leg portion 111 coaxially with each other. Various methods are possible to join these together.

In this embodiment, threaded grooves are formed in an outer circumference of the upper and lower end portions of the cylindrical light-transmitting portion 113A, respectively. Threaded grooves are formed in the inner circumference of the lower end portion of the cylindrical portion 112 and also in the inner circumference of the ring-shaped head portion of the leg portion 111. With this structure, the threaded grooves in the upper end portion of the cylindrical light-transmitting portion 113A are screwed into the threaded grooves in the lower end portion of the cylindrical portion 112, and also the threaded grooves in the lower end portion of the cylindrical light-transmitting portion 113A are screwed into the threaded grooves in the head portion of the leg portion 111. Thus, the cylindrical portion 112 and the leg portion 111 are continuously integrated together as one body through the cylindrical light-transmitting portion 113A.

The camera device 300 is mounted on its camera holder 311. The camera holder 311 is a cylinder molded of synthetic resin, a lower end and an upper end of which are held by the stoppers 121, 122, 133 and 134 in the cylindrical portion 112. The camera 310 is disposed in the hollow on the lower side of the camera holder 311, and the camera 310 is coaxially mounted on the rotation shaft SH of the motor M. The positions where the motor M and the camera 310 are disposed are designed so that the rotation axis SH coincides with the central axis of the cylindrical portion 112. In the longitudinal middle of the hollow of the camera holder 311, a bearing 341 of the motor M is provided to partition the hollow. Further, the substrate 320 on which the control unit for controlling the camera 310 and motor M, is mounted to the bearing 341.

In an upper portion of the hollow of the camera holder 311, a mounting portion 342 of the motor M is formed. Further, a battery 1000 is disposed on the head portion side of the motor M. The positive and negative electrodes of the battery 1000 are connected to a power supply terminal of the substrate 320 and a power supply terminal of the camera 310, respectively, via a power line that runs in through the wall of the camera holder 311. The power supply terminal of the camera 310 and the power supply terminal of the battery 1000 are electrically connected to each other via a contact terminal using a slip ring.

To the camera 310, a control signal from the control unit provided in the substrate 320 is given via a control line C1. The control line C1 and the camera 310 are also electrically connected to each other via a contact terminal using a slip ring. Further, the control unit of the substrate 320 can control the on/off operation of the motor M, rotational position, focus and the like. The control signal from the substrate 320 is also supplied to the motor M via a control line C2. With this structure, the position of the rotation angle of the motor M can be controlled.

The above-described embodiment is configured to rotate the camera 310 by using the rotation motor M. But, a pyramid-shaped reflector or a cone-shaped reflector as shown in FIG. 1 may be used as its reflector. When such a fixed reflector is used, the motor M is not necessary. Note that since the captured image may be deformed, a correction circuit is required in the image processing unit to correct the deformed image.

In the above-described embodiment as well, it is important that the camera device 300 catches the ball 10 located on the rim of the hole 11 in its field of view through the above-described reflector 303. In other words, it is important that the area including a part of the rim of the hole 11 or a part of the rim of the cup 12 is covered in the shooting area. Therefore, the field of view of the camera device 300 should desirably include a part of the area 30 mm to 50 mm away from the center of the leg portion 111.

In the above-described embodiment, the camera holder 311 holds the motor M and the battery 1000 as well. Further, around the inner circumference of the cylindrical portion 112, a reinforcement cylinder 401 made of steel or aluminum is provided to reinforce the strength of the pole 100. With the camera 310, the surroundings of the pole 100 can be shot through the reflector 303 and the cylindrical light-transmitting section 113A. With this structure, when the rotation of the motor M is controlled to change the rotational angular position of the camera 310, and thus the shooting direction is changed. Regardless of the rotational angular position of the camera 310, the field of view is not obstructed because the cylindrical light-transmitting portion 113A is used.

The above-described example is described in connection with a case where one camera device 300 is provided for one pole, but a plurality of camera devices 300 may be mounted to one pole.

Figure 8:
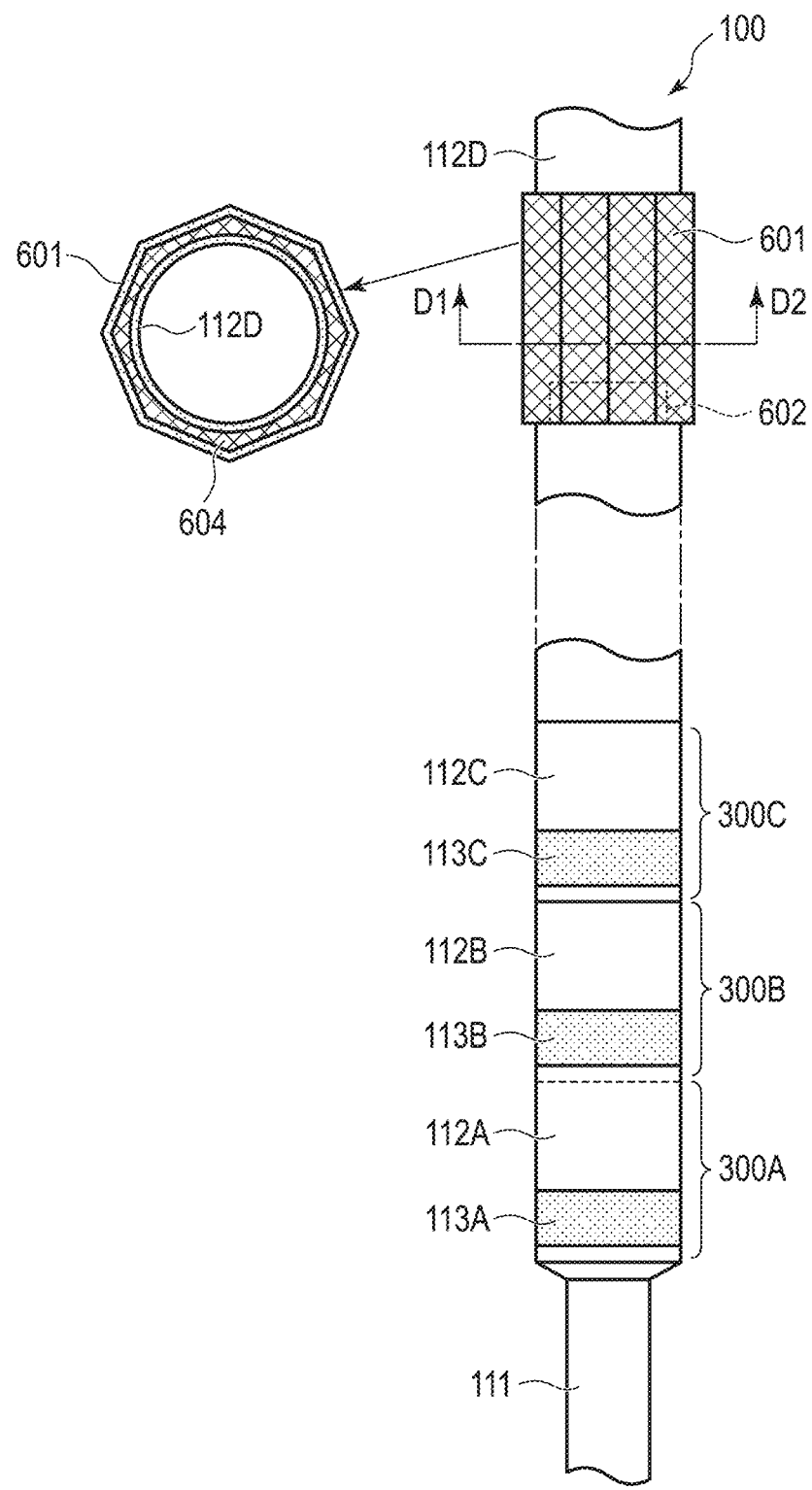
FIG. 8 is an explanatory diagram of a configuration of still another embodiment.

FIG. 8 is a diagram showing an example in which multiple camera devices 300A, 300B and 300C are mounted to a single pole 100. The basic structure is the same as that of FIG. 7. The angle of the reflector may be different from one camera to another. In this case, it is also important that the camera device 300A, which is located at the lowest (closest to the green surface), catches the ball 10 located at the rim of the hole 11 in its field of view through the reflector 303. In other words, it is important that the area including the hole 11 or part of the rim of the cup is covered in the shooting area. Therefore, the field of view of the camera device 300 should desirably cover a part of the area 30 mm to 50 mm away from the center of the leg portion 111.

On some greens, the surface is not necessarily flat and has a large undulation. In such a case, depending on the putting position of the ball, the ball may not be in the field of view of the camera device 300A. Here, by switching from the camera device 300A to the camera device 300B or the camera device 300C for shooting, it is possible to capture the ball located at a position higher than that of the cup.

Further, the pole 100 comprises a power generation panel 601 mounted to the outer circumference of the upper part of the cylindrical portion(, which is a cylindrical portion 112D). As shown in the cross section taken along line D1-D2, the power generation panel 601 is fixed to the cylindrical portion 112D by, for example, adhesive 604. Further, in the cylindrical portion 112D, a power storage circuit 602 is provided. Based on the electric current generated from the power generation panel 601, a voltage is stored in the power storage circuit 602. The voltage is then charged to a battery (secondary battery) that drives the camera devices. With this structure, it is possible to realize a regenerative energy device that utilizes sunlight, thus contributing to the conservation of the natural environment. Note that, in the figure, the outer circumferential surface of the power generation panel 601 protrudes outward from the outer circumferential surface of the pole 100 (a surface at a different position from the outer circumferential surface of the power generation panel 601). However, when used as a golf tool, the outer circumferential surface of the power generation panel 601 and the outer circumferential surface of the pole 100 are actually designed to be the same surface.

Figure 9:
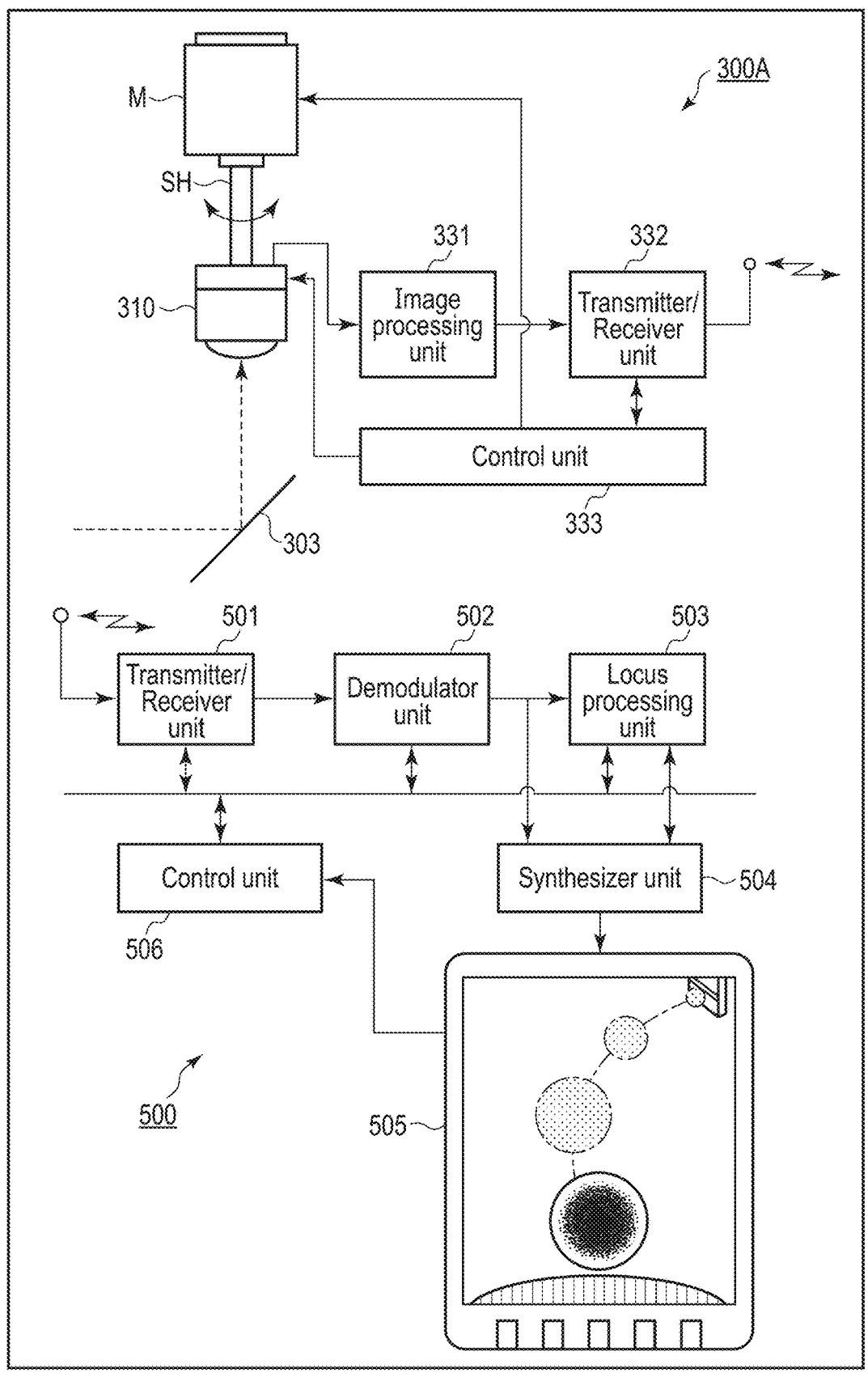
FIG. 9 is a block diagram showing an image pickup system using the camera device shown in FIG. 1, 5, 7 or 8.

FIG. 9 is a block diagram showing a shooting system using the camera device shown in FIG. 1, 5, 7 or 8. On the camera device 300A is shown as a typical one. The functions of the camera device 300A are the same as those described in FIG. 6. The signal captured by the camera device 300A is converted into a transmission signal by the transmitter/receiver unit 332, and the transmission signal is received by a transmitter/receiver 501 of a monitor device 500. The image processing unit 331 includes an encoder. There are various encoding modes for the encoder, which are not particularly limited.

The monitor device 500 receives the transmission signal at the transmitter/receiver 501 and demodulates the image signal at a demodulator unit 502. Note here that the demodulator unit 502 includes a decoder, which corresponds to the encoder on the transmission side of the image signal. The image signal decoded by the demodulator unit 502 is input to a locus processing unit 503 and a synthesizer unit 504. The locus processing unit 503 arranges the captured image signal in the time-axis direction in units of frames, and processes the image signal into a thin shadow, which is then supplied to the synthesizer unit 504. Particularly, the image signal obtained at this time is a signal obtained by detecting the motion vector and extracting the image of a moving object. In this case, it is a video of a ball, and the locus processing unit 503 creates a time-lapse image of the ball (locus image) and supplies it to the synthesizer unit 504.

The synthesizer unit 504 synthesizes the locus image and the real image from the demodulator unit 502, and inputs it to a display unit 505. Thus, the user can see how the ball is rolling on the green on the display unit 505. The thus synthesized image of about a few seconds may be stored in a memory not shown in the figure. The storage may be automatic or may be based on user operation. The memory may be a built-in memory inside the monitor or an IC memory installed from outside.

The monitor device 500 described above may be a smart phone, a monitor device of a TV station, or a repeater.

According to the embodiments of FIGS. 7, 8, and 9 described above, there is provided a camera device to be mounted in an axial middle portion of a pole when used, whose leg portion is let to stand on the bottom of a cup. The pole includes the cylindrical portion and the leg portion located in one axial end of the cylindrical portion and having a thickness less than the thickness of the cylindrical portion. Further, in the middle of the cylindrical portion, it comprises a cylindrical transparent coupling section constituted by a transparent member disposed coaxially with the cylindrical portion.

Next, in the vicinity of an upper portion of the cylindrical transparent member and the inside of the coupling portion of the cylindrical portion, downward-facing cameras 310 are provided and the cameras 310 are coupled with the rotation shaft of the motor M mounted on the camera holder 311 so as to be rotated under the controlled of the motor M. On the lens side of the camera 310, the reflector 303 is arranged which rotates in unison with the camera. The reflector 303 reflects the image of an external scenery transmitted through the coupling portion of the cylindrical transparent member and directs it to the image pickup lens of the camera 310.

The pole includes the above-described camera as a first camera device and also a second camera device with the same configuration as the first camera device above the first camera device.

Further, a power generation panel 601 is mounted to the outer circumference of the upper portion of the cylindrical portion (a cylindrical portion 112D). According to the current generated from the power generation panel 601, the power is stored at a voltage in the power storage circuit 602. The voltage is then charged to the battery (secondary battery) that drives the camera device.

Here, the leg portion 111 further comprises a lock portion 461 which locks an adapter when the adapter is to be attached to extend its distal end portion or change the direction thereof.

Various types of adapters can be mounted to the lock portion 461. Thus, the camera device can be made versatile.

Figure 10:
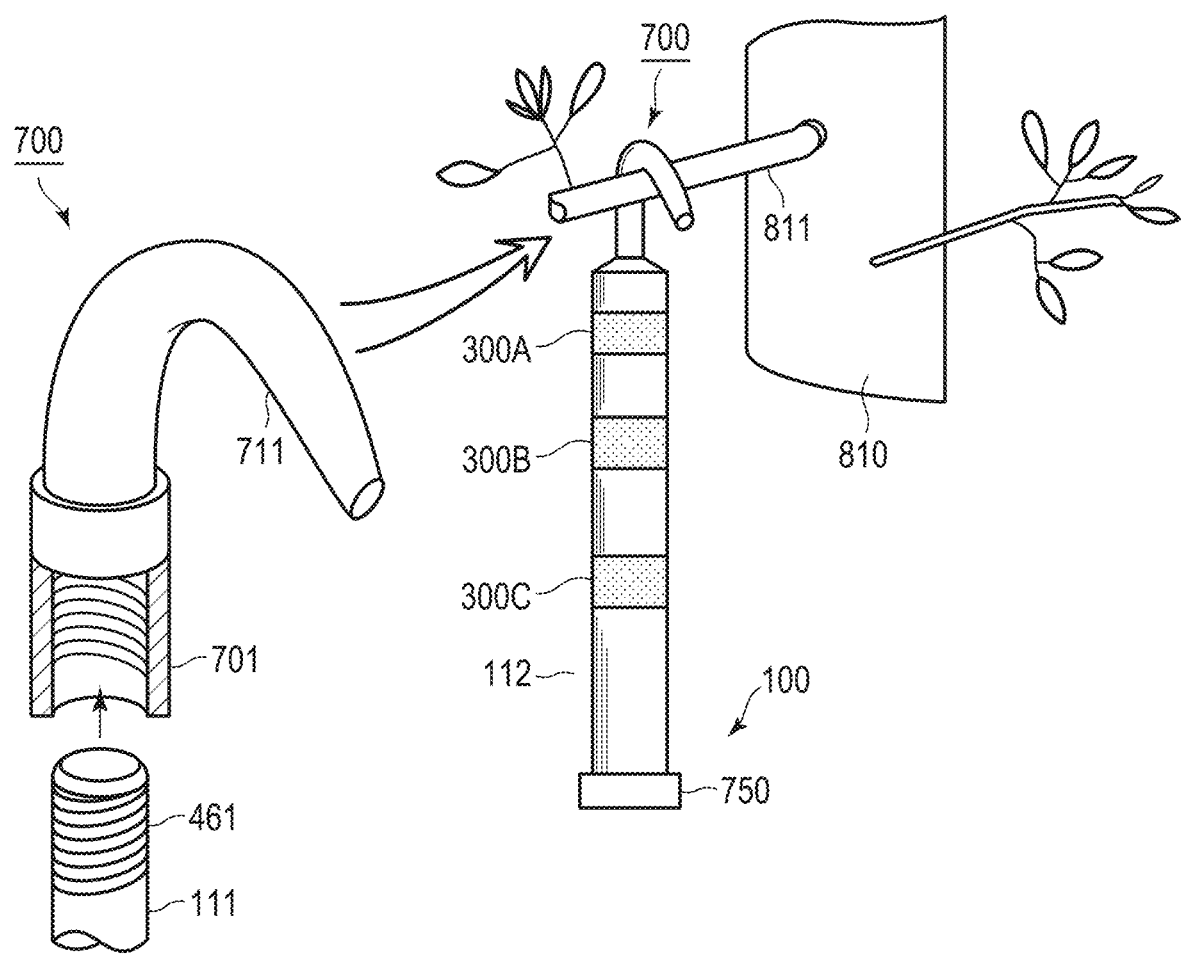
FIG. 10 is an explanatory diagram showing an example of the structure of a leg portion and an example of use of the camera device, according to still another embodiment.

The embodiment shown in FIG. 10 is an example in which the distal end of the leg portion 111 has a threaded structure (bolt), whereas the adapter 700 has a threaded hole (nut) 701. The distal end of the adapter 700 forms a hook 711 that modified into a V or U shape, for example. When the adapter 700 and the leg portion 111 are integrated as one body, the adapter 700 can be used to hang the pole 100 from a twig 811 of a tree 810, for example. With such a structure, the camera device is effective for observing small birds flying to the twig 811 or insects gathering on the twig 811. The preparatory operation for observation is simply hooking the adapter 700 onto the twig 811, and thus it is extremely easy to use.

To the end portion of the cylindrical member section 112, a cap 750 is mounted for waterproof. In other words, measures are taken to prevent water and unwanted objects from entering the cylindrical member section 112.

Figure 11:
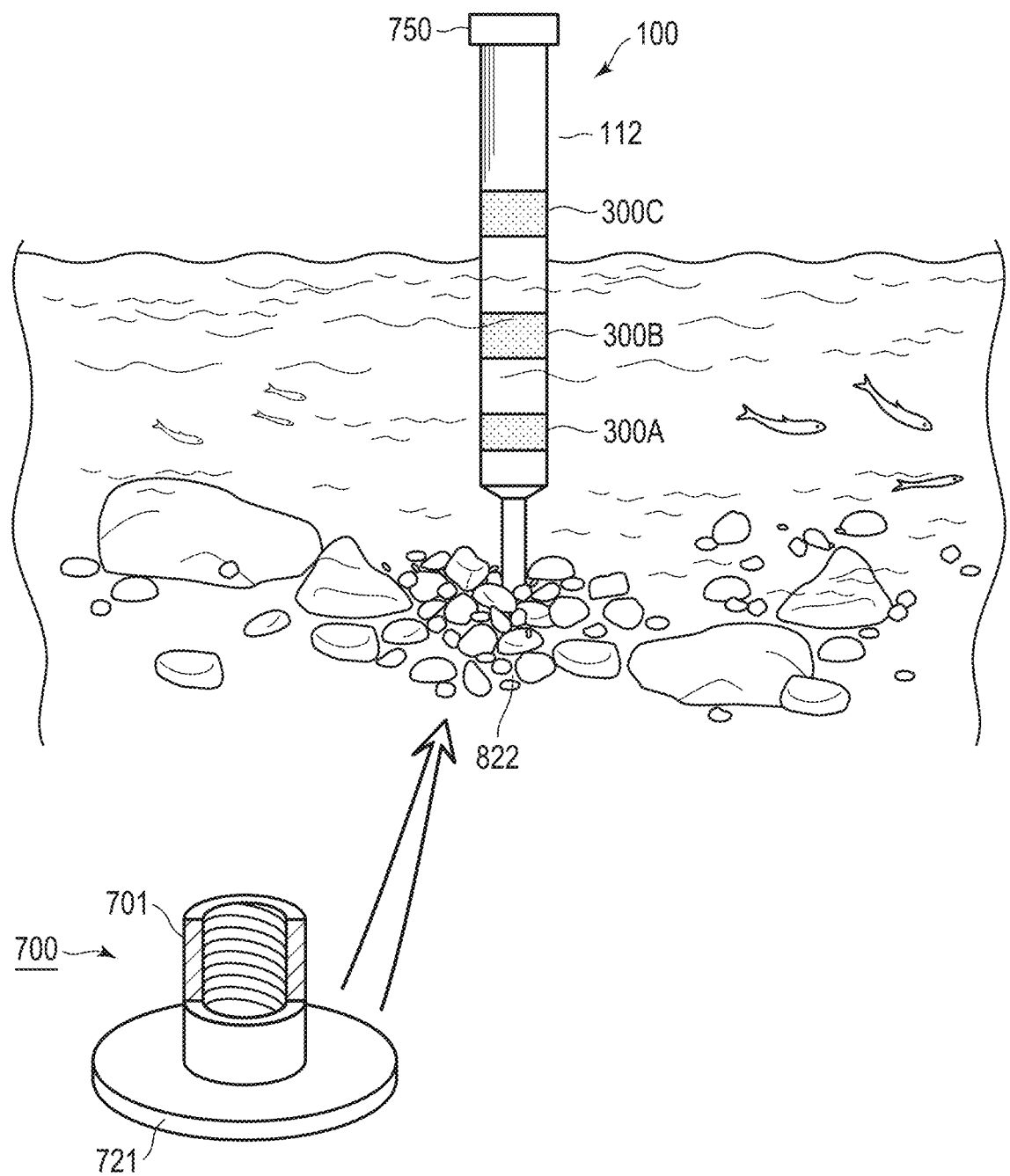
FIG. 11 is an explanatory diagram showing another example of the structure of a leg portion and another example of use of the camera device, according to still another embodiment.

The embodiment of FIG. 11 shows an example where one end portion of the adapter 700, which includes the threaded hole portion 701, comprises a flange 721. With such an adapter 700, for example, the camera device can be placed in the water of a stream, and a number of stones 822 are placed on the flange 721, to let the pole 100 stand. In this case, it is preferable that, for example, the camera device 300A is placed within the water and, for example, the camera device 300C is placed on the water surface. The camera device using such an adapter 700 is effective in observing and monitoring insects and fish in the water or on the surface of the water. The device is not only for use in a stream, but it may be placed in a water tank used for aquaculture, or even in a harbor or the like with use of a larger camera device(s). It is natural that the pole is waterproofed to prevent water from entering the inside.

Figure 12:
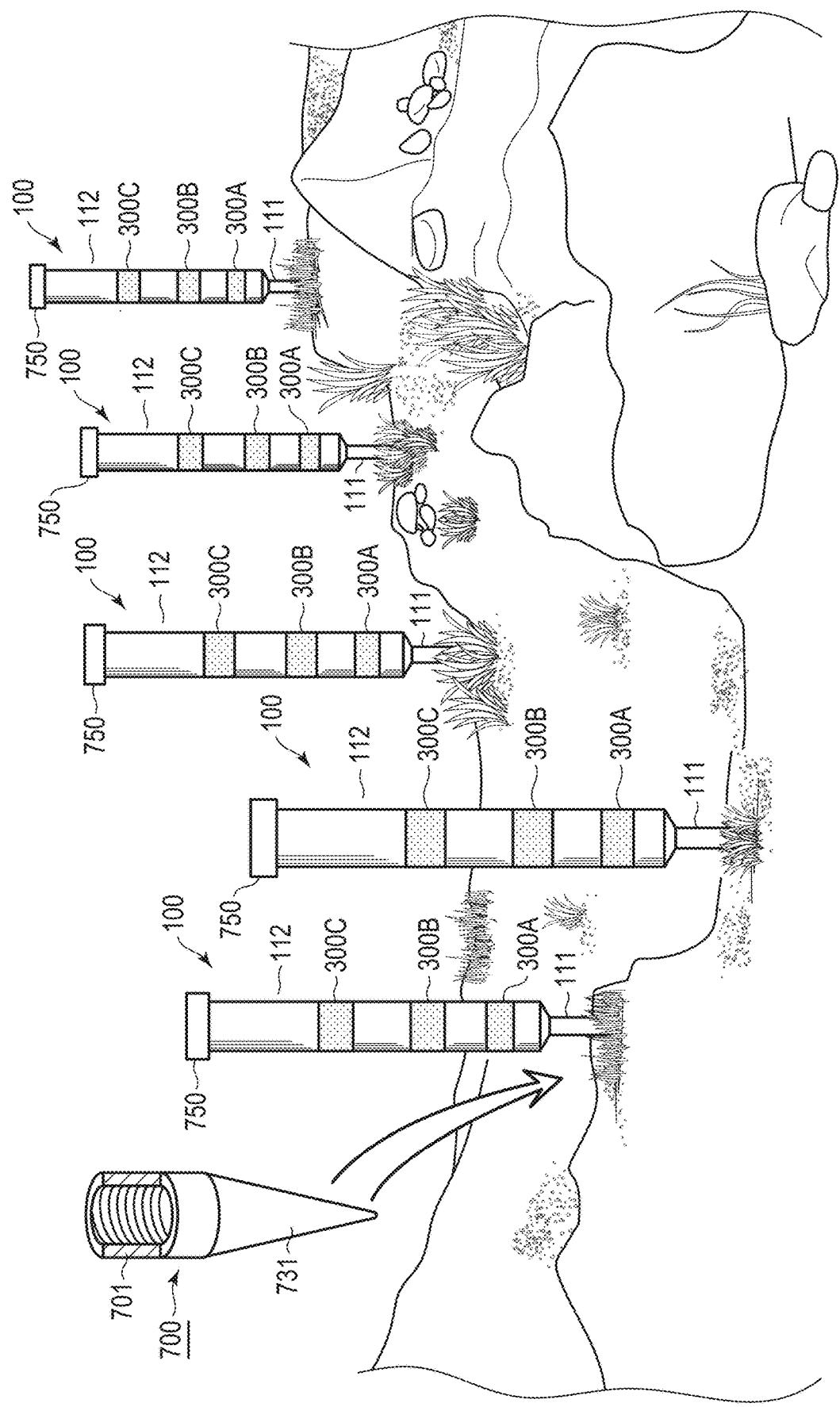
FIG. 12 is an explanatory diagram showing another example of the structure of a leg portion and another example of use of the camera device, according to still another embodiment.

The embodiment in FIG. 12 is an example in which an adapter 700 comprising a threaded hole portion 701 and a sharp arrowhead portion 731 at one end thereof. The camera device employing the adapter 700 can be placed by easily piercing the end portion thereof into the ground of, for example, a hill, meadow, field, garden, forest, mountainous area, pasture, etc. By placing a great number of camera devices of this type dispersedly, it is possible to observe and monitor various subjects over a large area.

It is naturally possible to use camera devices using the adapters shown in FIGS. 10, 11 and 12 in any combinations, according to the conditions of the monitoring/observation area.

Further, in the above-described embodiments, any of the camera devices 300A, 300B, and 300C may be an infrared camera. With use of an infrared camera, the usage will be greatly expanded into a wide range of applications. For example, it can be used to monitor animals at night.

Further, not only a camera, but also a microphone, speaker, ultrasonic generator and ultrasonic receiver may be added to the pole in selective combinations. With addition of a microphone, it is possible to collect the sounds emitted by various animals, birds, insects, etc., thereby making it possible to analyze the ecosystem. By using the microphone and speaker to output sounds generated by birds and animals, it is possible to study the interaction with birds and animals. Furthermore, with the use of an ultrasonic generator and ultrasonic receiver, it is possible to study interaction with living creatures in the sea and underwater. Moreover, in the water, multiple camera devices are linked between their poles, ultrasonic waves can be utilized.

Alternatively, the versatile camera devices can be used for a guidance system to guide a climber walking along a trail or a passerby passing through a predetermined passage.

FIG. 13 shows an example of the format of data transmitted from the transmitter of the transmitter/receiver unit 332 that transmits image signals of the camera devices. The transmitted data contains headers 900 and data 902 repetitiously. Each header 900 contains a pole ID 90, a first camera ID 91, a second camera ID 92 and a third camera ID 93. The data 902 contains packetized data 911, 912 and 913 of the first camera, the second camera and the third camera respectively. Audio data may as well be contained. Further, some other sensor data such as temperature data may as well be contained. The data 902 forms a packet stream, and each packet contains a packet ID (PID) and encoded data (Edata). In each of the embodiments described above, the field of view of the camera device 300A closest to the leg portion should desirably include a part of the area 30 mm to 50 mm away from the center of the leg portion 111. Depending on the object to be monitored, the field of view of the camera device 300A may include a part of the area 10 mm or more from the center of the leg portion 111.

In some of the embodiments described above, the drawings may be schematically represented with respect to the width, thickness, shape, etc., of each part, as compared to the actual state, in order to make the description clearer. In addition, it is within the scope of the present invention if multiple embodiments are combined and implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A versatile camera device to be mounted to a pole, the device comprising:
   a cylindrical portion;
   a leg portion mounted to the cylindrical portion to extend from one end of the cylindrical portion, the leg portion being insertable into an insertion hole made in the bottom of a cup disposed in a hole on a green;
   a plurality of sets each including
      a light-transmitting portion provided in an axial middle portion of the cylindrical portion toward the other end and forming a part of the cylindrical portion;
      a reflector which receives light entering from the light-transmitting portion and guides the light to one axial side thereof; and
      an image pickup camera disposed inside the cylindrical portion and including an image sensor receiving the light reflected from the reflector, the plurality of sets being provided at vertically different positions along a longitudinal direction of the cylindrical portion and each image pickup camera positioned to capture images from a different position of the vertically different positions;
   a control substrate disposed inside the cylindrical portion and including controller circuitry and communication circuitry that generate and transmit radio waves including image signals from each image pickup camera;
   a battery disposed inside the cylindrical portion and driving the communication circuitry, the controller circuitry and each image pickup camera; and
   a lid which seals the other end of the cylindrical portion and encloses each reflector, each image pickup camera, the control substrate and the battery.

2. The versatile camera device of claim 1, further comprising:
   a lock portion formed in the leg portion, on which an adapter is mountable, the adapter extending a distal end portion of the leg portion or changing a direction thereof.

3. The versatile camera device of claim 2, wherein
   one end of a hook is mounted to the lock portion of the leg portion, and the cylindrical member portion is suspended on the hook when used.

4. The versatile camera device of claim 2, wherein
   a flange is mounted to the lock portion of the leg portion, and the flange is disposed on a bottom of a water so as to stand the cylindrical portion up from the water to above a water surface when used.

5. The versatile camera device of claim 2, wherein
   the plurality of sets includes a first set and a second set placed along a longitudinal direction of the cylindrical portion, and
   a flange is mounted to the lock portion of the leg portion, and the flange is disposed on a bottom of a water so that the first set is located underwater and the second set is located above the water surface.

6. The versatile camera device of claim 2, wherein,
   an arrowhead is attached straight to the lock portion of the leg portion, and the arrowhead is stuck into a ground to stand the cylindrical portion upright when used.

7. The versatile camera device of claim 1, wherein
   the communication circuitry transmits the radio waves to a smartphone or a recorder, and the controller circuitry controls the image pickup camera according to an outside control signal received by the communication circuitry, to control focusing of the image pickup camera.

8. The versatile camera device of claim 1, wherein the diameter of the cup is 108 mm (±5 mm), and the distance from the inner wall of the cup to the outer circumferential surface of the leg is 47.7 mm (±5 mm), and a part of the edge of the hole or a part of the edge of the cup is covered by a shooting area of the image pickup camera located at a lowest position.

* * * * *